United States Patent [19]

Butler

[11] 4,095,825
[45] Jun. 20, 1978

[54] TAPER PIPE JOINT

[76] Inventor: Major Gene Butler, 14707 Early Hollow, Cypress, Tex. 77429

[21] Appl. No.: 727,923

[22] Filed: Sep. 30, 1976

Related U.S. Application Data

[63] Continuation-in-part of Ser. No. 580,997, May 27, 1975, abandoned.

[51] Int. Cl.² ............................................. F16L 13/10
[52] U.S. Cl. ..................................... 285/55; 156/294; 285/334.4; 285/DIG. 16
[58] Field of Search ..................... 285/334.4, DIG. 16, 285/381, 423, 345, 332, 284, 374, 55; 156/294, 158, 330

[56] References Cited

U.S. PATENT DOCUMENTS

| | | | |
|---|---|---|---|
| 1,917,992 | 7/1933 | Menne | 285/334.4 X |
| 2,498,831 | 2/1950 | Veitch | 285/DIG. 16 X |
| 3,210,095 | 10/1965 | Elliott | 285/55 |
| 3,508,766 | 4/1970 | Kessler et al. | 285/55 X |
| 3,567,257 | 3/1971 | Nowosadko | 285/334.4 X |
| 3,606,403 | 9/1971 | Medney | 285/334.4 |
| 3,909,045 | 9/1975 | Meagher | 285/DIG. 16 |

*Primary Examiner*—Thomas F. Callaghan
*Attorney, Agent, or Firm*—Michael P. Breston

[57] ABSTRACT

A taper pipe joint formed by telescoping a pin inside a bell, wherein the bell has an outer cylindrical section and an inner conical section tapering inwardly, and the pin also has a conical section tapering inwardly. The taper angle of the pin's conical section is greater than the taper angle of the bell's conical section. An adhesive is disposed in the cavity between the inner conical surface of the bell and the outer conical surface of the pin to establish a sealed joint therebetween and to form a solid ring at the mouth of the joint.

10 Claims, 7 Drawing Figures

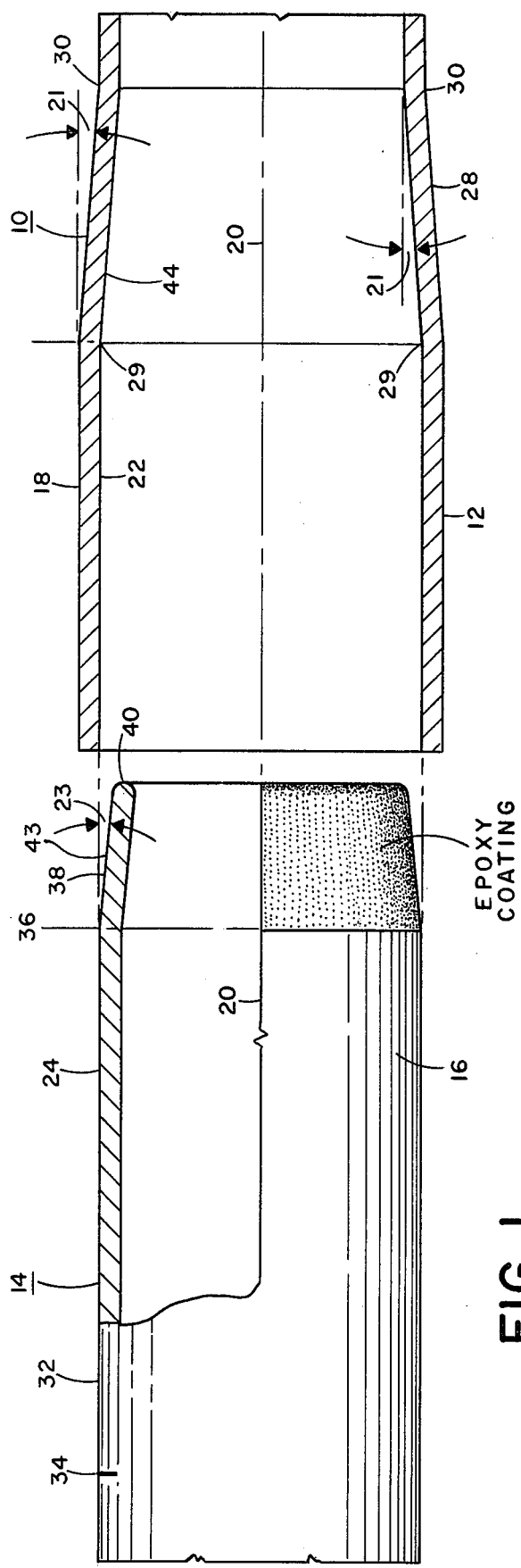
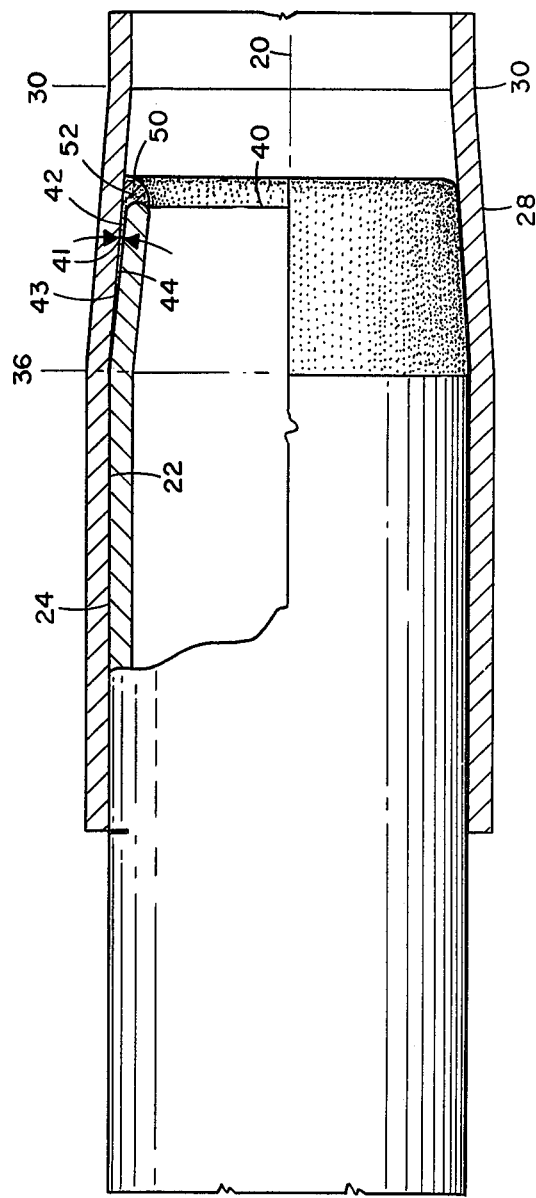
FIG. 1.
FIG. 2.
EPOXY COATING

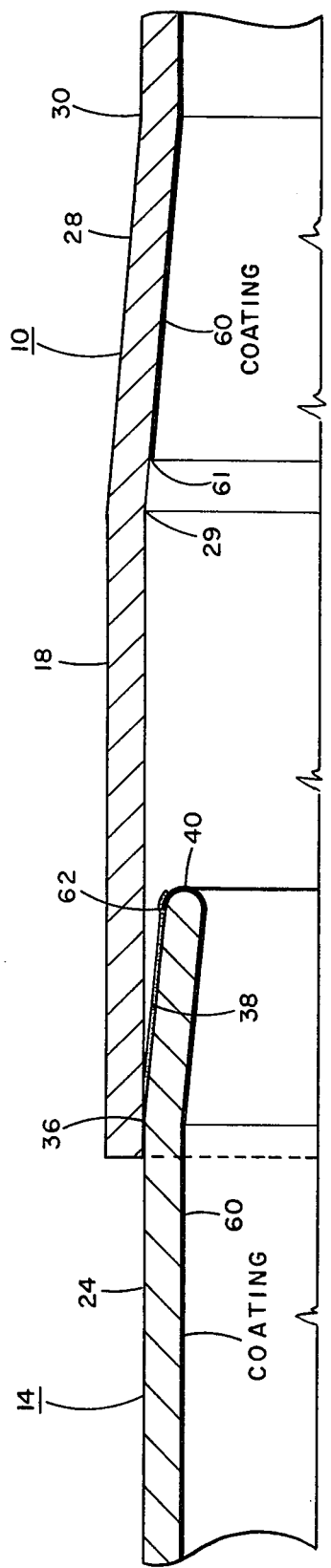
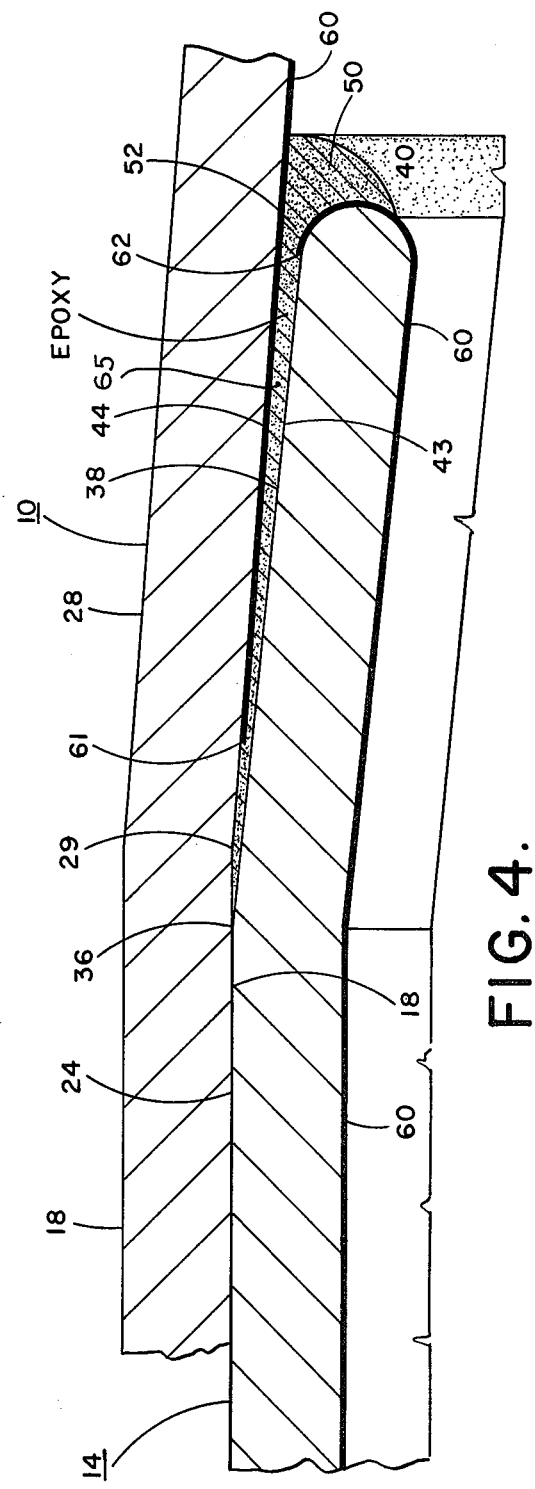
FIG. 3.
FIG. 4.

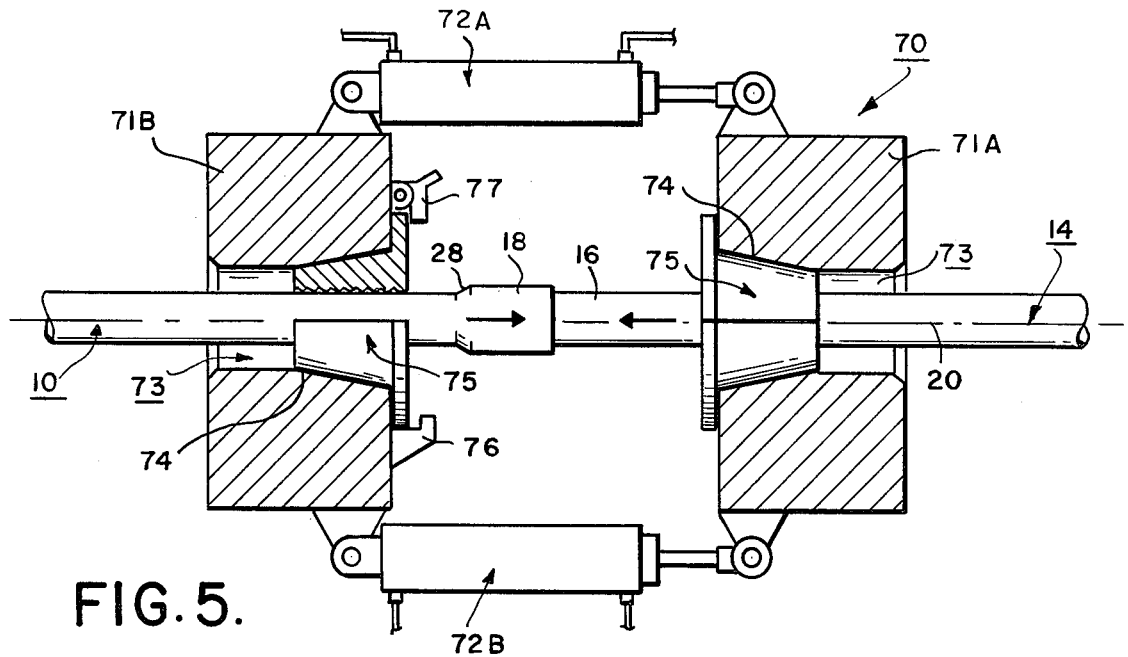
FIG. 5.
FIG. 7.
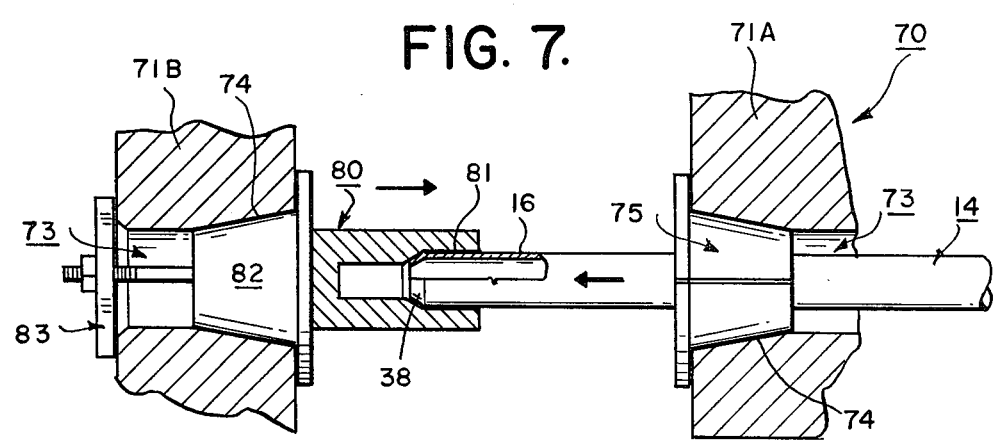
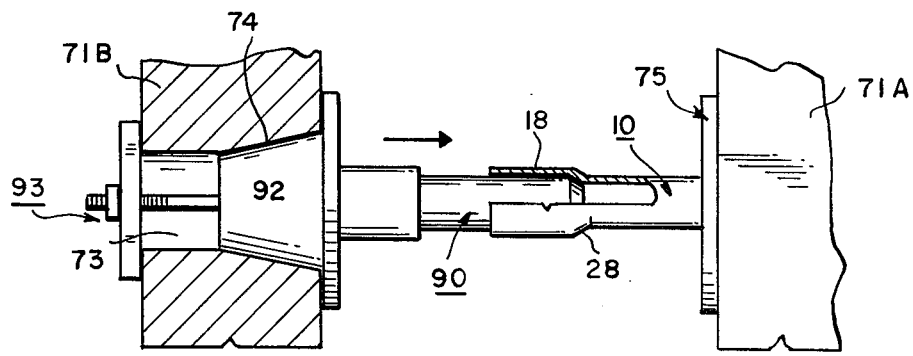
FIG. 6.

TAPER PIPE JOINT

REFERENCE TO RELATED APPLICATION

This application is a continuation-in-part of my pending application Ser. No. 580,997, filed on May 27, 1975, and now abandoned.

BACKGROUND OF THE INVENTION

Several pipe joining methods are known. Many pipe joints have a bell, a pin, and are characterized by an external clamping ring around the bell. The pin may be sealed with a suitable adhesive material.

U.S. Pat. No. 3,208,136 describes a method which consists of forming a bell on one pipe, and rolling an annular groove in the end of the other pipe. The grooved end is only partially telescoped inside the bell with sufficient force to cause the walls of the groove to slightly buckle.

Pipes used in the oil industry for transporting hydrocarbon products are internally coated. Conventional pipe joints are vulnerable to chemical attack, especially in the region, known as the "mouth", where the end wall of the pin makes contact with the inner wall of the bell.

This invention provides a pipe joint that is mechanically very strong, that is relatively inexpensive to make or to repair in the field, and that is capable of carrying corrosive fluids, such as hydrocarbon products, under substantial pressure. An internal, flexible, adhesive, pore-free ring is automatically formed at the mouth of the joint during the connection process. This ring blends with the internal pipe coatings to protect the mouth of the connection against corrosion.

SUMMARY OF THE INVENTION

The pipe joint made with the process of this invention has a cylindrical, mechanical interference section that is followed by a substantial, conical, non-interference section whose opposed walls are chemically sealed to each other.

The method of the invention can be practiced with coated and uncoated pipe, although the method has particular utility for coated pipe. The conical section of the pin is first coated with a flexible adhesive. Then by telescoping the pin inside the bell, the flexible adhesive becomes extruded from the cavity between the bell and the pin, to thereby automatically form a ring which completely covers the mouth of the joint. The ring bridges the gap between the coated sections of pipe, thereby providing a continuous coating throughout the connection. Thus, for internally-coated pipe, there is provided a completely-coated run of pipe inclusive of the joint.

The principles and advantages of the invention will become better understood from the following description, when taken in conjunction with the accompanying drawings.

BRIEF DESCRIPTION OF THE DRAWINGS

FIG. 1 shows a joint for bare pipe, including a sectional view of the bell, and a partly sectional view of the pin, the pin being shown in a position just prior to being telescoped inside the bell;

FIG. 2 illustrates the joint of FIG. 1 after completion;

FIGS. 3 and 4 are, respectively, similar to FIGS. 1 and 2 but for internally coated pipe;

FIG. 5 is a sectional view showing a hydraulically-operated pulling device for telescoping the pin inside the bell; and FIGS. 6 and 7 show the device of FIG. 5 with mandrels shaped to form the bell and the pin, respectively.

DETAILED DESCRIPTION OF PREFERRED EMBODIMENTS

Referring now to FIGS. 1 and 2, there is shown a first bare pipe 10 having a bell 12. A second bare pipe 14 that is to be joined with pipe 10 is provided with a pin 16.

Bell 12 has a cylindrical section 18 of substantial length along the longitudinal axis 20. The bore formed by cylindrical wall 22 of section 18 has a diameter slightly smaller than the diameter of the outer cylindrical wall 24 of pin 16, so as to form a tight, metal-to-metal, mechanical "interference" fit between walls 22 ad 24 (FIG. 2).

Section 18 in bell 12 is followed by a conical section 28 also of substantial length along the longitudinal axis 20. Conical section 28 extends from the inner end 29 of cylindrical section 18 and tapers inwardly, toward the longitudinal axis 20, at an angle of taper 21. The conical section 28 interfaces with pipe 10 at a transverse plane passing through point 30.

The pin 24 has a cylindrical section 32 extending between points 34 and 36. Cylindrical section 32 is followed by a conical section 38 until the end face 40 of pipe 14. From point 36 to end face 40, the conical section 38 tapers inwardly at an angle of taper 23.

In accordance with this invention, angle 23 is larger than angle 21 so that when the pipe joint is made up (FIG. 2), there is established a cavity 42 between the outer conical surface 43 of conical section 38 and the inner conical surface 44 of conical section 28. Cavity 42 extends approximately from point 36 to the end face 40. The radial width 41 of cavity 42, between the opposed tapered surfaces 43, 44, uniformly increases from point 36 to the end face 40. The magnitude of the width 41, at any one point along cavity 42, is determined by the magnitude of the difference between angles 21 and 23. It is critical, however, especially for coated pipe, that this angular difference be at least 2° for reasons subsequently explained.

In accordance with an important aspect of this invention, a non-interference fit is established between the opposed conical surfaces 43, 44 for a substantial length of cavity 42 along the longitudinal axis 20, extending from the end face 40 inwardly toward point 36. The length of cavity 42 is selected so as not to restrict the bore of the pipeline formed with pipe sections 10 and 14. The exact dimensions for a particular joint, and the taper angles will be selected in dependence upon the size of pipe being joined, the wall thickness of the pipe, and whether or not the pipes are internally coated.

Essentially, the method of forming the taper joint consists of fabricating each pipe section with a bell at one end and with a pin at the other end. Prior to making the joint, the outer wall 43 of conical section 38 is coated with a sufficiently thick layer of liquid epoxy adhesive. As the pin is gradually, forcibly, and fully telescoped inside the bell, the adhesive is progressively squeezed out in the longitudinal direction. This progressive squeezing action produces several beneficial effects: (1) the outer wall 43 of the pin tends to exert a distributed pressure against the adhesive, such as is required for a strong and stable joint; and (2) the adhesive extruded from cavity 42 also forms an annular ring 50 which seals the mouth 52 of the joint.

When solidified, the adhesive forms a continuous, solid tapering wall 65 (FIG. 4) inside cavity 42, thus avoiding the drawbacks of most conventional joints in which unavoidable burrs on the opposed walls 43, 44 cause "holidays" or pores to exist in the connection. The presence of such holidays is very detrimental to the strength and corrosion resistance of the joint.

The angular difference between angles 21 and 23 must be at least 2° in order that the flexible adhesive becomes properly extruded under pressure without holidays or pores, and that a sufficient volume of adhesive be available from cavity 42 to form a sufficiently wide ring 50 so as to fully cover the mouth 52.

FIGS. 3 and 4 are essentially similar to FIGS. 1 and 2, except that pipe sections 10 and 14 are internally coated. Pipes 10 and 14 have an internal coating 60 which, in the case of section 10, extends up to a point 61 near, but preferably not as far as, the interface 29 between the cylindrical section 18 and the conical section 28. In the case of section 14, coating 60 covers the entire inner wall, the end face 40, and a small portion of outer wall 38 up to a point 62.

It was found that by making the angular difference between the angles 21 and 23 at least 2°, with internally-coated pipe, there can be formed a completely and continuously coated run of pipe, since the coating 60 on the inner wall of the bell becomes fully bridged with the coating 60 on the inner wall of the pin through the annular ring 50, so that no bare metal will be exposed to the action of corrosive fluids carried by the pipeline. Consequently, any hydrocarbon products which may be carried by the pipeline will be prevented from attacking the metal of the pipe joint at its most vulnerable point, that is, the mouth 52. The liquid adhesive which quickly hardens to form the ring 50 and the solid tapering wall 65 provides a perfect seal between the opposed conical walls 43, 44.

The interference, or metal-to-metal fit between cylindrical sections 18 and 24 provides, in both the internally coated pipes and in the uncoated pipes, an extremely high-strength and leak proof connection with the required mechanical strength to the joint such as to protect wall 65 and ring 50 from having to sustain excessive tension and torsion stresses, as will become subsequently apparent.

An apparatus 70 which is adapted to make the joint of this invention is schematically illustrated in FIGS. 5–7. The arrangement shown in FIG. 5 is illustrated in connection with the making of a pipe joint with pipe sections 10 and 14 which already have a pin and a bell formed at their opposite ends. The apparatus comprises two opposing block members 71A and 71B. Each block member has a central bore 73 therethrough which is coaxial with the longitudinal axis 20 of the pipe sections 10 and 14 desired to be joined. From the inner face of each block extends a conical cavity 74 which tapers inwardly toward the longitudinal axis 20. Cavity 74 forms a receiving chamber for tools 75, 82 and 92 that selectively may be placed therein. Each tool is manually locked in place by latch means 76 and 77 (only shown on block 71B in FIG. 5 to simplify the drawings). The blocks 71A, 71B are movably coupled by a pair of hydraulically-operated cylinders 72A and 72B.

Tool 75 is split along a diameter and has teeth constructed to grip the pipe (FIG. 5). By applying a sufficient hydraulic pressure to the cylinders 72A, 72B, FIG. 5 illustrates how pin 16 becomes telescopically, forcibly, and fully inserted into the bell's cylindrical section 18. The yielding of the engaged walls in the bell and pin does not exceed the elastic limit of the pipe's material and a solid mechanical interference fit with the proper restraining force will remain at all times.

In FIGS. 6 and 7 is illustrated how apparatus 70 can be easily adapted for forming the pin and the bell. Thus the cylindrical section 18 and the tapered wall 28 of bell 12 can be formed by a tool 92 (FIG. 6) having a solid mandrel member 90 which is adapted to become forcibly inserted into the cylindrical pipe 10. Tool 92 may be one unit which is latched tightly by a clevis-and-bolt arrangement 93. The mandrel 90 is coaxially aligned with the longitudinal axis 20 of the pipes 10 and 14. As pressure is applied by the cylinders 72A and 72B, blocks 71A and 71B move toward each other, thereby forcing the cylindrical end of pipe section 10 over mandrel 90 which forms the conical section 28.

The pin 16 is formed in a manner similar to bell 12. Tool 82 (FIG. 7) is similar to tool 92 except that its mandrel 80 has a cavity 81 shaped to form the pin. The tapered end of cavity 81 forms the conical section 38. Tool 82 is held in place by a clevis-and-bolt arrangement 83.

Although in a pipe manufacturing factory the pins and the bells are formed by automated machinery, in the field it is desirable to have the portable apparatus 70 for making repairs on ruptured pipelines, as well as for making pins and bells on new pipe sections, by simply interchanging the tools 75, 82, and 92 on blocks 71A and 71B.

In addition to the above mentioned advantages, the taper joint of this invention is a mechanical connection with joint strength which is far superior to other known mechanical joints and approaches the strength of a welded joint on steel pipe. The taper joint will withstand internal pressure in excess of 100% of specified minimum yield strength of pipe material joined. If longitudinally pulled, it will withstand up to 90% of the tensile strength of the pipe material joined.

The taper pipe joint of this invention meets all the requirements of the Department of Transportation and Office of Pipeline Safety code specifications. These federal safety regulations specify welding for the joining of gas and liquid carrying pipelines so as to meet the pressure and strength requirements for such service conditions. The taper pipe joint can also join internally coated pipe for corrosive service. Since the taper pipe joint is formed from the pipe itself, it is a very economical means for joining pipe. Also, a skilled person is not required for the making of a reliable joint with the process of this invention. Because of the nature of the taper joint, the connection is the same each time it is made, substantially independent of the skill of the operator making the joint.

What is claimed is:

1. The method of making a taper pipe joint between a first metal pipe and a second metal pipe, characterized by:
   (a) making a bell at one end of the first pipe, said bell having a cylindrical section and an adjacent conical end section tapering inwardly toward the longitudinal axis of the pipe; the inner diameter of the bell's cylindrical section being slightly smaller than the outer diameter of the second pipe to form a metal-to-metal interference fit therebetween;

(b) making a pin at one end of the second pipe, said pin having a conical end section tapering inwardly and whose taper angle is larger than the taper angle of the bell's conical section, whereby the angular difference between said conical sections defines a cavity therebetween, and (c) placing a liquid adhesive in said cavity, between the inner conical wall of the bell and the outer conical wall of the pin, to thereby form a sealed joint between said conical sections, and an annular ring at the mouth of said cavity.

2. The method of claim 1, wherein said angular difference is at least two degrees.

3. The method of claim 2, wherein said first and second pipes are internally coated, and said ring fully bridges the gap between the coatings of said pipes.

4. A taper pipe joint for connecting the ends of a pair of pipe metal sections, comprising:

(a) coaxially inter-engageable, inner and outer, conically-tapered, pin-and-bell end portions on the respective pipe sections;

(b) the angle of taper of the inner pin-end portion being greater than the angle of taper of the outer bell-end portion, whereby the angular difference between said tapered portions defines a conical cavity therebetween;

(c) the relative diameters of said pipe sections at the inner ends of said tapered end portions being such as to define a metal-to-metal interference fit between the pipe sections; and (d) an adhesive interposed in compressed relation between the inter-engaged tapered end portions, said adhesive forming a solid wall in said cavity and an annular ring at the mouth of said cavity.

5. The taper pipe joint of claim 4 wherein, said pipe sections are internally coated, and said ring fully bridges the gap between the coatings of the pipe sections.

6. The taper joint of claim 5, wherein said angular difference is at least 2°.

7. In a pipe joint the combination of:

a first metal pipe section and a second metal pipe section, said first pipe section having an integral bell consisting of (1) a cylindrical portion of substantial length and having a bore whose diameter is slightly smaller than the outer diameter of the second pipe section to form a metal-to-metal interference fit therebetween, and of (2) a conical portion extending from said cylindrical portion and tapering inwardly;

said second pipe section having an integral pin consisting of a conical portion tapering inwardly, the length of the pin's conical portion being slightly smaller than the length of the bell's conical portion, and the conical portion of the bell having an angle of taper smaller than the pin's angle of taper, whereby when the pin is forcibly and fully telescoped inside the bell, the inner conical surface of the bell and the outer conical surface of the pin form a cavity therebetween which extends from the interface between the bell's conical and cylindrical portions toward the end face of the pin; and a compressed adhesive disposed in said cavity and forming a solid wall bonding the pin to the bell.

8. The pipe joint according to claim 7 wherein said adhesive forms a ring at the mouth between the end face of the pin and the opposite portion of the bell's inner conical wall.

9. The pipe join of claim 8, wherein said pipe sections are internally coated and said ring forms integral part with the coatings of said pipe sections.

10. The pipe joint of claim 9 wherein said bell's angle of taper is smaller by at least 2° compared to the pin's angle of taper.

* * * * *